United States Patent
Quinlan et al.

(10) Patent No.: US 10,555,147 B2
(45) Date of Patent: *Feb. 4, 2020

(54) SYSTEMS AND METHODS FOR FACILITATING SERVICE PROVISION BETWEEN APPLICATIONS

(71) Applicant: BlackBerry Limited, Waterloo (CA)

(72) Inventors: Sean Michael Quinlan, Duvall, WA (US); Haniff Somani, Mercer Island, WA (US); Sanjiv Maurya, Fremont, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 193 days.

This patent is subject to a terminal disclaimer.

(21) Appl. No.: 15/581,130

(22) Filed: Apr. 28, 2017

(65) Prior Publication Data

US 2017/0230468 A1 Aug. 10, 2017

Related U.S. Application Data

(63) Continuation of application No. 14/599,310, filed on Jan. 16, 2015, now Pat. No. 9,667,707, which is a (Continued)

(51) Int. Cl.
*G06F 15/16* (2006.01)
*H04W 4/60* (2018.01)
(Continued)

(52) U.S. Cl.
CPC ............ *H04W 4/60* (2018.02); *H04L 67/42* (2013.01); *H04W 4/029* (2018.02); *H04W 4/50* (2018.02)

(58) Field of Classification Search
CPC ......... H04L 67/10; H04L 67/16; H04L 67/18; H04W 4/001; H04W 4/003; H04W 4/02
(Continued)

(56) References Cited

U.S. PATENT DOCUMENTS 5,691,973 A * 11/1997 Ramstrom ........... H04Q 3/0029
379/252
6,055,424 A * 4/2000 Tornqvist ............ H04M 1/2478
455/414.4
(Continued)

FOREIGN PATENT DOCUMENTS

| CN | 1902608 | 1/2007 |
|---|---|---|
| EP | 1705576 | 9/2006 |
| EP | 2498529 | 9/2012 |

OTHER PUBLICATIONS

"Locating Application Data Across Service Discovery Domains," Paul Castro et al. IEEE/ACM MobiCom annual Conference, Jul. 16, 2001.
(Continued)

*Primary Examiner* — Ario Etienne
*Assistant Examiner* — Thorne E Waugh
(74) *Attorney, Agent, or Firm* — Fish & Richardson P.C.

(57) ABSTRACT

Embodiments of the invention are concerned with facilitating service provision between software applications. In embodiments of the invention, a first user terminal includes an application which causes the first user terminal to delegate execution of a first service to a different application. In response to determining that the first service is to be executed on behalf of the first service, a request message is sent to a data store including an identifier of the first service. The data store comprising entries indicating applications held on one or more user terminals, and indicating one or more services that may be executed, on request, by a corresponding application. The first user terminal receives a response message from the data store identifying one or more applications to which execution of the first service may be delegated.

22 Claims, 9 Drawing Sheets

Related U.S. Application Data continuation-in-part of application No. PCT/US2013/050632, filed on Jul. 16, 2013.

(60) Provisional application No. 61/672,457, filed on Jul. 17, 2012.

(51) Int. Cl.
   *H04W 4/50* (2018.01)
   *H04W 4/029* (2018.01)
   *H04L 29/06* (2006.01)

(58) Field of Classification Search
   USPC .................................................. 709/201–230
   See application file for complete search history.

(56) References Cited

U.S. PATENT DOCUMENTS

| | | | |
|---|---|---|---|
| 6,181,935 B1* | 1/2001 | Gossman | H04M 3/42127 455/432.2 |
| 6,714,969 B1* | 3/2004 | Klein | G06F 1/1616 709/219 |
| 7,062,558 B2 | 6/2006 | Rolia | |
| 7,533,141 B2 | 5/2009 | Nadgir | |
| 7,680,797 B1 | 3/2010 | Singh et al. | |
| 9,110,750 B2* | 8/2015 | Somani | G06F 8/61 |
| 9,185,146 B2* | 11/2015 | Kawato | H04L 65/40 |
| 2003/0051029 A1 | 3/2003 | Reedy et al. | |
| 2005/0038829 A1 | 2/2005 | Chidambaran et al. | |
| 2006/0010234 A1 | 1/2006 | Reedy et al. | |
| 2007/0156897 A1 | 7/2007 | Lim | |
| 2010/0144314 A1* | 6/2010 | Sherkin | G06F 21/33 455/411 |
| 2010/0223471 A1* | 9/2010 | Fresko | H04L 63/08 713/176 |
| 2011/0040824 A1* | 2/2011 | Harm | G06F 9/45529 709/203 |
| 2011/0041140 A1* | 2/2011 | Harm | G06F 9/4843 719/318 |
| 2011/0088011 A1 | 4/2011 | Ouali | |
| 2011/0251992 A1 | 10/2011 | Bethlehem et al. | |
| 2014/0040343 A1 | 2/2014 | Nickolov | |
| 2014/0325531 A1* | 10/2014 | Harm | G06F 9/4843 719/320 |

OTHER PUBLICATIONS

International Search Report and Written Opinion dated Jan. 7, 2014 on related application No. PCT/ US2013/050632, filed Jul. 16, 2013.

Extended European Search Report issued in European Application No. 13820097.7 dated Dec. 9, 2015.

Office Action issued in Chinese Application No. 201380038153.9 dated Sep. 8, 2016.

\* cited by examiner

| Service | Organization | Visibility | Description | Versions | Interface definition | Apps |
|---|---|---|---|---|---|---|
| Service 1 | Enterprise 3 | Public | Printing | Version 1 | Definition 1 | App 1 version 2 |
| | | | | Version 2 | Definition 2 | App 2 version 1<br>App 3 version 1 |
| | | | | ... | ... | ... |
| Service 2 | Enterprise 10 | Private | Cryptography | Version 1 | Definition 3 | App 6 version 4 |
| | | | | Version 2 | Definition 4 | App 7 version 1<br>App 7 version 2 |
| | | | | ... | ... | ... |
| Service 1 | Enterprise 1 | Private | User authentication | Version 1 | Definition 5 | App 4 version 3 |
| | | | | Version 2 | Definition 6 | App 4 version 4<br>App 5 version 5<br>App 9 version 1 |
| | | | | ... | ... | ... |
| ... | ... | ... | ... | ... | ... | ... |

*FIG. 5a*

| Terminal | Organization | Installed applications | Version |
|---|---|---|---|
| Terminal 1 | Enterprise A | App 1 | Version 1 |
| | | App 2 | Version 3 |
| | | ... | ... |
| Terminal 2 | Enterprise A Enterprise B | App 3 | Version 3 |
| | | App 4 | Version 2 |
| | | ... | ... |
| Terminal 3 | Enterprise C | App 2 | Version 6 |
| | | App 4 | Version 1 |
| | | ... | ... |
| ... | | ... | ... |

FIG. 5b

SYSTEMS AND METHODS FOR FACILITATING SERVICE PROVISION BETWEEN APPLICATIONS

CROSS-REFERENCE TO RELATED APPLICATIONS

This application is a continuation of U.S. application Ser. No. 14/599,310, filed Jan. 16, 2015, which is a continuation-in-part of International Application No. PCT/US2013/050632, filed Jul. 16, 2013 (published in the English language by the International Bureau as International Publication No. WO/2014/014879 on Jan. 23, 2014), which claims the benefit of U.S. Provisional Patent Application No. 61/672,457, filed Jul. 17, 2012. The entire contents of each of the above-referenced applications are hereby incorporated by reference.

BACKGROUND OF THE INVENTION

The present invention relates to the field of software applications and provides methods, user terminals, systems and computer program products for facilitating service provision between such software applications.

User terminals such as mobile telephones, laptop computers, desktop computers and the like often execute software functions that perform various functions on the user terminal. Such applications may be pre-installed on the user device, such that they are held on the device at the time of purchase, or they may be installed on the device subsequent to purchase. In the latter case, a user may connect to an application portal, such as the Apple® Appstore™ or Android™ Marketplace, via their user terminal, whereupon they are presented with a selection of applications available for download and installation.

In some cases, enterprises may also maintain their own application distribution systems for distributing application to user devices connected thereto, in which entitlement to applications is determined on the basis of enterprise provided user or device authentication credentials.

The operating systems of such user devices typically provide frameworks that allow for applications to communicate and interoperate. This enables some applications (herein referred to as "service providing applications") to provide services for other applications (herein referred to as "service consuming applications"). For example, a printing application may provide service enabling printing of documents on behalf of a document viewing application; in another example, a cryptography application may provide a service for decrypting data (or example, e-mail data) on behalf of another application (for example, an e-mail application). In some cases, the service providing application and the service consuming application may be held on the same user terminal. In other cases, the service providing application may be held on a device remote from the user terminal on which the application is held, such as another user terminal or a server device.

However, for each given service (defined by an interface definition defining the input parameters for the service), there is typically only one application available for providing the service. It would be desirable to provide a framework for facilitating the development of multiple service providing applications for executing a given service.

Further, applications held on a user terminal may not be aware of the presence of other applications available for the provision of services of which it may make use. Therefore, an application may not be aware of the services that may be available to it from the other applications. In particular, the applications held on a given user device, or on other devices accessible by the given user device, may change over time. As described above, a user may install new applications on the device; applications may also be deleted. It would be desirable to provide a discovery framework enabling applications held on a user terminal to identify services that are available from other applications held on the user terminal.

SUMMARY

In accordance with aspects of the disclosure, there are provided methods, user terminals, server systems and computer program products according to the appended claims.

According to a first aspect, there is provided a method for use by a first user terminal, the first user terminal comprising a processor and a first application to be executed by the processor, the first application being configured to cause the processor to delegate execution of a first service to a further, different, application, the method comprising: determining that the first service is to be executed on behalf of the first application; responsive to the determination, sending, to a data store, a request message comprising an identifier of the first service, the data store comprising entries indicating a plurality of applications held on one or more user terminals, and indicating one or more services that may be executed, on request, by a corresponding application of the plurality of applications; receiving a response message from the data store, the response message identifying one or more applications held on the one or more user terminals to which execution of the first service may be delegated; and causing the processor to delegate execution of the first service to a second application, the second application being one of the identified one or more applications.

In exemplary embodiments according to this aspect, the first application is able to discover applications, held on the first user terminal or on another user terminal, which provide services which that the first application may delegate. In exemplary embodiments, this facilitates sharing of services between applications.

In an embodiment, the response message identifies a plurality of applications held on the one or more user terminals and the method comprises selecting the second application from the plurality of applications. The second application may be selected based on a user selection, or the selection may be made by the user terminal based on a criterion or criteria such as whether the second application is located on the same user terminal as the first application, the operating system of respective user terminals on which the applications are held and/or relative locations of the user terminals on which the respective applications are held. In exemplary embodiments, these features improve the provision of services between applications by enabling selection of an appropriate service providing application.

In an embodiment, the method comprises sending, from the first application to the second application, a request for the execution of the first service.

In an embodiment, the request for the execution of the first service comprises a service identifier identifying the first service.

In an embodiment, the request for the execution of the first service comprises a version identifier identifying a version number of the first service.

In an embodiment, the first service comprises a plurality of functions and the request for the execution of the first service comprises a function identifier identifying a first function of the plurality of functions.

In an embodiment, the request for execution of the first service comprises an identifier of the first application.

In an embodiment, the request for execution of the first service comprises address information relating to the first application.

In an embodiment the method comprises sending, to the selected application, data in relation to which the first service is to be executed.

In an embodiment, the method comprises receiving, from the selected application, data resulting from the execution of the first service.

In an embodiment, the response message received from the data store comprises address information relating to the second application and the request for the execution of the first service is sent using the address information.

In an embodiment, the method comprises sending the request for execution of the first service via a library application programming interface (API) held on the first user terminal.

In an embodiment, the method comprises configuring the processor to execute an installation process in respect of the first application, thereby configuring the first user terminal with first application and, thereafter, sending a registration message to a server system to register that the first application has been installed on the first user terminal. The method may also comprise configuring the processor to execute an installation process in respect of the second application, thereby configuring the first user terminal with the second application and, thereafter, sending a registration message to a server system to register that the first application has been installed on the user terminal. In exemplary embodiments, these features enable the server system to compile records of applications held on user terminals, whereby the server system can facilitate application discovery by applications on the user terminals.

In an embodiment, the data store is held at a server system remote from the first user terminal.

In an embodiment, the data store is held at the first user terminal. The method may comprise: retrieving, from a server system remote from the first user terminal, data identifying applications held on the one or more user terminals and services that may be executed, on request, by the applications held on the one or more user terminals; and maintaining the entries in the data store on the basis of the retrieved information. In exemplary embodiments, these features enable the user terminal to maintain local records of available services and applications, whereby applications on the user terminal may request services from other applications even when the user terminal is not connected to the remote server system.

In an embodiment the first user terminal comprises a mobile device.

According to a second aspect, there is provided a computer program product comprising a non-transitory computer-readable storage medium having computer readable instructions stored thereon, the computer readable instructions being executable by a user terminal to cause the user terminal to perform a method for use on the user terminal, the user terminal comprising a processor and a first application to be executed by the processor, the first application being configured to cause the processor to delegate execution of a first service to a further, different, application, the method comprising: determining that the first service is to be executed on behalf of the first application; responsive to the determination, sending, to a data store, a request message comprising an identifier of the first service, the data store comprising entries indicating a plurality of applications held on one or more user terminals, and indicating one or more services that may be executed, on request, by a corresponding application of the plurality of applications; receiving a response message from the data store, the response message identifying one or more applications held on the one or more user terminals to which execution of the first service may be delegated; and causing the processor to delegate execution of the first service to second application, the second application being one of the identified one or more applications.

The computer program product of the second aspect may be adapted to provide features corresponding to any of those described above in relation to the method of the first aspect.

According to a third aspect, there is provided a user terminal comprising a processor and a first application to be executed by the processor, the first application being configured to cause the processor to delegate execution of a first service to a further, different application, the user terminal being configured to: determine that the first service is to be executed on behalf of the first application; responsive to the determination, send, to a data store, a request message comprising an identifier of the first service, the data store comprising entries indicating a plurality of applications held on one or more user terminals, and corresponding entries each indicating one or more services that may be executed, on request, by a corresponding application of the plurality of applications; receive a response message from the data store, the response message identifying one or more applications held on the one or more user terminals to which execution of the first service may be delegated; and delegate execution of the first service to second application, the second application being one of the identified one or more applications.

The user terminal of the third aspect may be adapted to provide features corresponding to any of those described above in relation to the method of the first aspect.

In accordance with a fourth aspect, there is provided a method for use by a first user terminal, the first user terminal comprising a processor and a first application to be executed by the processor, the first application being configured to cause the processor to delegate execution of a first service to a further, different, application, the method comprising: retrieving, from a server system remote from the first user terminal, data identifying applications held on the user terminal and services that may be executed, on request, by the applications held on the user terminal; based on the retrieved data, maintaining, on a memory of the first user terminal, entries indicating a plurality of applications held on one or more user terminals and indicating one or more services that may be executed, on request, by a corresponding application of the plurality of applications; receiving a request message from the first application, the request comprising an identifier of the first service; based on the identifier of the first service, determining one or more applications held on the one or more user terminals to which execution of the first service may be delegated; sending a response message to the first application, the response message identifying the determined one or more applications.

In accordance with a fifth aspect, there is provided a method for use by a first user terminal, the first user terminal comprising a processor and a first application to be executed by the processor, the first application being configured to delegate execution of the first service to a further, different, application, the method comprising: storing, at a data store, entries indicating a plurality of applications held on one or more user terminals, and indicating one or more services that may be executed, on request, by a corresponding application of the plurality of applications; receiving a request message from the first application, the request message comprising an identifier of a first service; accessing the data store to determine one or more applications held on the one or more user terminals capable of executing the first service on behalf of the first application; sending a response message for receipt by the first application, the response message identifying the determined one or more applications capable of executing the first service on behalf of the first application.

In accordance with a sixth aspect, there is provided computer program product comprising a non-transitory computer-readable storage medium having computer readable instructions stored thereon, the computer readable instructions being executable by a first user terminal to cause the first user terminal to perform a method for use on the first user terminal, the first user terminal comprising a processor and a first application to be executed by the processor, the first application being configured to cause the processor to delegate execution of a first service to a further, different, application, the method comprising: storing, at a data store, entries indicating a plurality of applications held on one or more user terminals, and indicating one or more services that may be executed, on request, by a corresponding application of the plurality of applications; receiving a request message from the first application, the request message comprising an identifier of a first service; accessing the data store to determine one or more applications held on the one or more user terminals capable of executing the first service on behalf of the first application; sending a response message for receipt by the first application, the response message identifying the determined one or more applications capable of executing the first service on behalf of the first application.

The fourth, fifth and sixth aspects provide methods which facilitate discover of applications held on a user terminal. The fourth, fifth and sixth aspects may be may be adapted to provide features corresponding to any of those described above in relation to the method of the first aspect.

In accordance with a seventh aspect, there is provided a server system for use with a plurality of user terminals, the server system comprising a memory and one or more processors, the user terminals each comprising one or more applications for execution thereon, the memory being configured to store: a plurality of user terminal identifiers each identifying a user terminal of the plurality user terminals; a plurality of application identifiers, each of the application identifiers identifying an application held on a respective user terminal; and a plurality of service identifiers, each of the service identifiers identifying a service that may be executed by a respective the application on behalf of a further, different, application, the one or more processors being configured to: receive a request message from a first user terminal, the request message comprising a first user terminal identifier identifying the first user terminal; access the memory to identify, based on the first user terminal identifier, one or more of the applications and one or more services that corresponding ones of the identified applications are configured to execute; send a response message to the first user terminal, the response message identifying the identified one or more applications and corresponding one or more services.

In exemplary embodiments, the server system of the seventh embodiment is able to maintain records of services provided by applications held on user terminals, and to provide this information, on request, to user terminals, facilitating service discovery by applications on those user terminals.

In an embodiment each of the user terminals and each of the services is associated with to one or more groups of a plurality of groups, and the memory is configured to store data indicating one or more groups with which each of the user terminals and each of the applications is associated, wherein the services are categorized according to a plurality of categories, and the memory is configured to store data indicating the category of each of the services, the plurality of categories including a first category and a second category, the first category comprising services that may be provided to applications that are not associated with the same group as the service, and the second category comprising services that may not be provided to applications that are not associated with the same group as the service, wherein, in the case that a given identified service of the second category is not associated with a group with which the first user terminal is associated, the one or more processors are configured not to identify the given identified service in the response message.

In exemplary embodiments, these features enable particular applications to be inhibited from discovery by other applications. Some organizations, such as enterprises may wish to share services only with user terminals associated with the organization, for example.

In accordance with an eighth aspect, there is provided a method for use by a first user terminal, the first user terminal comprising a processor and a first application to be executed by the processor, the first application being configured to cause the processor to delegate execution of a first service to a further, different, application, the method comprising: determining that the first service is to be executed on behalf of the first application; responsive to the determination, sending, to a data store, a request message comprising an identifier of the first service, the data store comprising entries identifying a plurality of applications and one or more services that may be executed, on request, by a corresponding application of the plurality of applications; receiving a response message from the data store, the response message identifying two or more applications to which execution of the first service may be delegated; and causing the processor to delegate execution of the first service to a second application, the second application being one of the identified two or more applications.

In an embodiment, at least the second application is held on a server device, remote from the first user terminal. In some cases, it may be desirable to store the service providing application at a server system, rather than at a user terminal. This enables the service to be provided without the necessity to download and install the application on the user terminal. This may be particularly advantageous where the service providing application requires a large amount of memory space or processing resources, for example.

In accordance with a ninth aspect, there is provided a method for use by a first user terminal, the first user terminal comprising a processor and a first application to be executed by the processor, the first application being configured to delegate execution of the first service to a further, different, application, the method comprising: storing, at a data store, entries identifying a plurality of applications and one or more services that may be executed, on request, by a corresponding application of the plurality of applications; receiving a request message from the first application, the request message comprising an identifier of a first service; accessing the data store to determine two or more applications held on the one or more user terminals capable of executing the first service on behalf of the first application; sending a response message for receipt by the first application, the response message identifying the determined two or more applications capable of executing the first service on behalf of the first application.

The method of the ninth aspect may be adapted to provide features corresponding to any of those described above in relation to the server system of the eighth aspect.

In accordance with a tenth aspect, there is provided a server system for registering services that may be executed on behalf of given application by a further, different, application, the server system comprising a memory, one or more processors and a communications interface device, the one or more processors being configured to receive, via the communications interface, information relating to services and applications, including: a first application identifier identifying a first application configured to execute a given service on behalf of a second, different, application; a service identifier identifying the service; and one or more input parameters required for the execution of the service, the one or more processors being configured to store, in the memory, data entries including the first application identifier, the service identifier and the one or more input parameters, and indicating an association between the first application identifier and the service identifier.

In exemplary embodiments according to the first aspect, the server system provides a repository of available services, and input parameters relating to same, facilitating the development of applications providing the registered service.

In an embodiment, the one or more processors are configured to receive, via the communications interface, a request message from a requesting party, the request message including the service identifiers; and responsive to the request message, sending the requested one or more parameters to the requesting party. The server system may be configured to: receive from the requesting party, via the communications interface, a message including a third application identifier identifying a third application, different to the first application, the third application being configured to execute the service; and store, in the memory, one or more data entries including the third application identifier, and indicating an association between the third application and the service. In exemplary embodiments, these features enable multiple applications providing a given service to be developed and registered, facilitating development of applications and subsequent application discovery.

In accordance with an eleventh embodiment, there is provided a method of provisioning a server system with one or more software components for registering services that may be executed on behalf of given application by a further, different, application, the server system comprising a memory, one or more processors and a communications interface device, the method comprising: provisioning the server system with a first software component for configuring the one or more processors to receive, via the communications interface, information relating to services and applications, including: a first application identifier identifying a first application configured to execute a given service on behalf of a second, different, application; a service identifier identifying the service; and one or more input parameters required for the execution of the service, the method comprising provisioning the one or more processors with a software component for configuring one or more processors to store, in the memory, data entries including the first application identifier, the service identifier and the one or more input parameters, and indicating an association between the first application identifier and the service identifier.

The method of the eleventh aspect may be adapted to provide features corresponding to any of those described above in relation to the server system of the tenth aspect.

Further features and advantages of embodiments of the invention will become apparent from the following description of some preferred embodiments of the invention, given by way of example only, which is made with reference to the accompanying drawings.

BRIEF DESCRIPTION OF THE DRAWINGS

FIG. 5a is a first schematic diagram showing data stored in a server system in accordance with an embodiment;

FIG. 5b is a second schematic diagram showing data stored in a server system in accordance with an embodiment;

DETAILED DESCRIPTION OF CERTAIN INVENTIVE EMBODIMENTS

Figure 1:
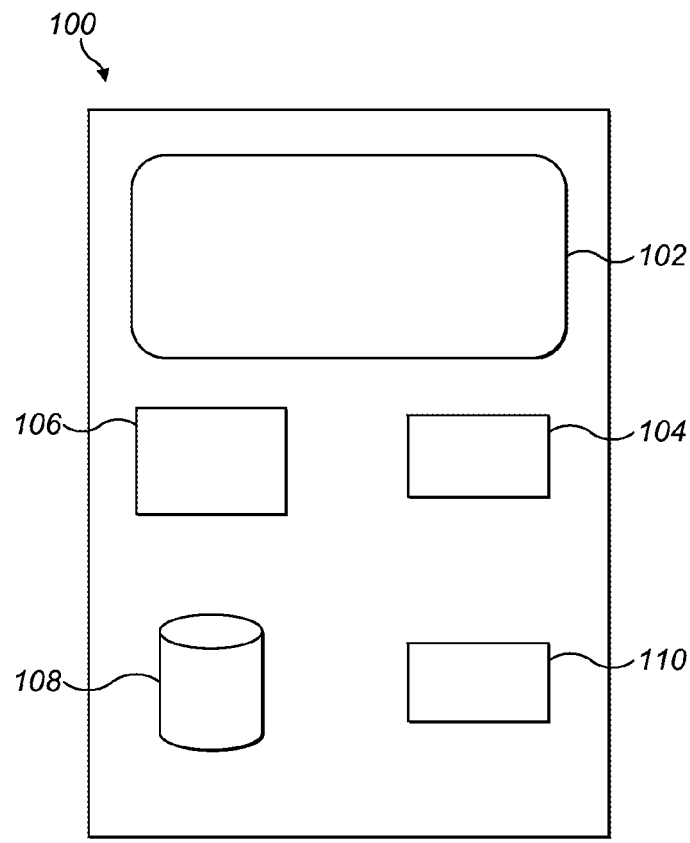
FIG. 1 is a schematic block diagram illustrating components of a user terminal in accordance with an embodiment.

FIG. 1 is a schematic diagram showing components of an example of a user terminal 100 according to some embodiments. The user terminal may be a portable computing device 100 such as a mobile telephone (for example, a smart phone), a Personal Digital Assistant (PDA), tablet computer or notebook computer etc.

The user terminal 100 includes a display screen 102, which may be a touch screen which can receive user input, and/or the computing device 100 may have a separate input device such as a keyboard 104 or some pointing device (not shown), which may be integral or connected wirelessly or by wired connection to the user terminal 100. The user terminal 100 further includes a processor 106 and a data store 108. The data store 108 may include one or more computer-readable media. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The processor 106 processes instructions stored in the data store 108. These instructions are in the form of computer software in the form of one or more programs that implement an operating system; exemplary operating systems include the Apple® iOS and Android™ operating systems. The data store 108 is also used by programs running on the processor 106 as a means of storing and accessing data in the form of electronic signals where the data is used during the execution of the programs. The operating system provides a file system for storing, modifying and accessing files held in the data store. This file system may be accessible by other programs running on the processor 106 via the programmatic interface provided by the operating system. Programs running on the processor 102 also process user input received from, for example, the touch screen 102 or keyboard 104, etc. The user terminal 100 also includes a network interface 110 (or a plurality of such interfaces) which allows programs running on the processor 102 to transmit and receive data to and from other devices and systems via a communications network (or a plurality of such networks), via wired and/or wireless connections.

Figure 2:
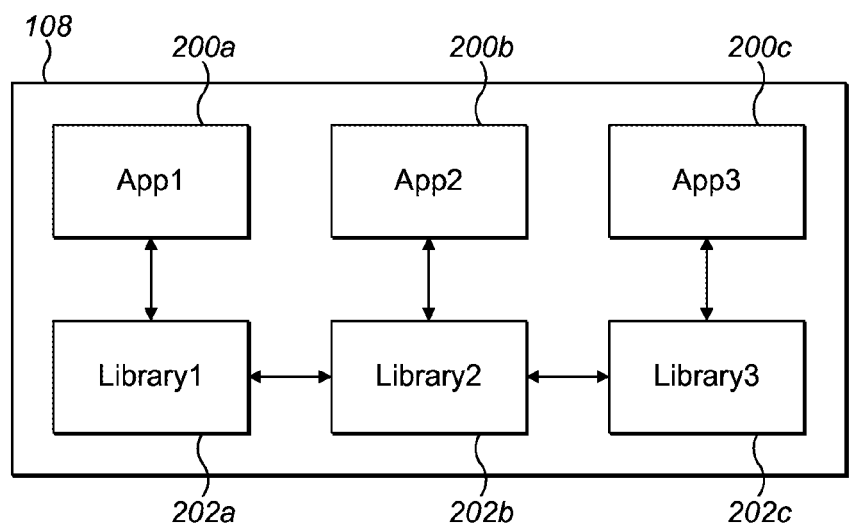
FIG. 2 is a schematic diagram showing software components held in a data store of the user terminal illustrated in FIG. 1.

As shown schematically in FIG. 2, the data store 108 may also store software applications App1 200a, App2 200b and App3 200c (herein referred to as "applications") which execute specific tasks on the user terminal 100, such as tasks relating to document viewing, word processing, accounting, cryptography, searching etc. The applications may be pre-installed on the user terminal 100, or they may be subsequently installed by the user, for example by downloading the application from a remote data store; the installation of applications is described below. The data store 108 may also include a library application programming interface (API) (herein referred to as a "library") which provides a collection of resources used by the applications 200a, 200b, 200c, such as configuration data, message templates, subroutines etc. The library may also facilitate communication between different applications, by for example serializing data for transmission. FIG. 2 shows three instances of a library, namely Library1 202a, Library2 202b and Library3 202c associated with App1 200a, App2 200b and App3 200c, respectively. Whilst three applications and libraries are shown in FIG. 2, it will be understood that user terminals 100 typically include tens or hundreds of applications.

Figure 3:
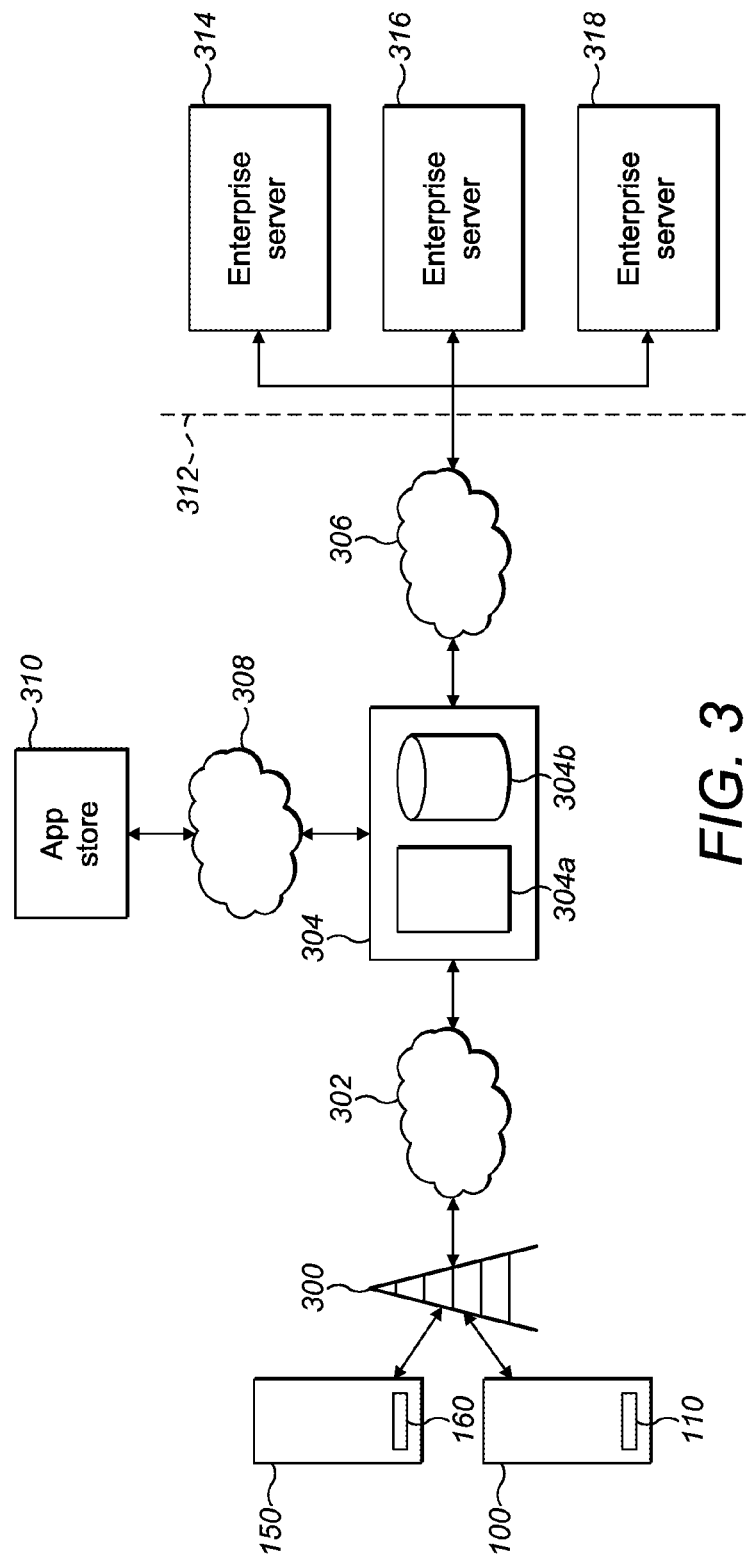
FIG. 3 is a schematic diagram illustrating components of a system for use in an embodiment.

FIG. 3 is a schematic diagram of a system in accordance with an embodiment. The network interface 110 on the user terminal 100 may include a radio access network interface which is able to communicate with a wireless access node 300, such as a base station or a wireless access point, which provides access to a communications network 302. The network interface 110 may be able to connect to the wireless access node 120 using one or more of a number of radio access technologies, including for example Global System for Mobile Communications (GSM), Universal Mobile Telecommunications System (UMTS), Long Term Evolution (LTE), and fixed wireless access (such as IEEE 802.16 WiMax), and wireless networking (such as IEEE 802.11 WiFi). Alternatively or additionally, the network interface 112 may provide for wired connections to the communications network 302, such as via a modem or router or the like.

The user terminal 100 communicates with a server system via the communications network 302; this may be performed using a networking program that allows communication between programs running on the processor 106 and external apparatus via the communications network 302. The server system with which the user terminal communicates includes a Network Operations Center (NOC) 304. The NOC 304 may include a computer server or a plurality of computer servers which can communicate using a communications interface, via a communications network 306, with other remote data processing devices, such as one or more enterprise servers 314, 316, 318 which are connected to an enterprise network (not shown). The NOC 304 includes one or more processors 304a and a memory in the form of a database 304b.

Access to the one or more enterprise servers 314, 316, 318 and the enterprise network from the communications network 306 may typically be controlled by a firewall 312 between the communications network 306 and the enterprise network such that all network traffic that passes between the communications network 306 and the enterprise network can be monitored and, optionally, inhibited if it does not satisfy criteria enforced by the firewall 312. For example the firewall 312 may be configured to only allow network connections between the NOC 304 and one or more enterprise servers 314, 316, 318, and to discard all other network connections from the communications network 306 to the one or more enterprise servers 160, 162, 164 and/or the enterprise network.

The user terminal 100 may also communicate with other third party computer servers that provide other services, such as an app store 310 for distributing software applications. This may be done via the NOC 304 and a communications network 180.

FIG. 3 also shows a further, different user terminal 150, which also includes a network interface 160 which is able to connect with the NOC 304 via the wireless access node 300 and communications network 302. Although, not shown, the further user terminal 150 may also include the same or similar components as the user terminal 100 illustrated in FIG. 1, such as a processor, data store, touch screen and/or keyboard etc. The data store of the further user terminal 150 may store one or more software applications similar to or the same as those described above with reference to FIG. 2.

Although FIG. 3 shows only two user terminals 100, 150 connected to the NOC 304, it will be appreciated that typically more than two user terminals 100, for example hundreds or thousands of user terminals may connect with an NOC 304.

The communications networks 302, 306 and 308 may each be or include the Internet and/or a public land mobile network (PLMN) and/or a public switched telephone network (PSTN). Communication across each of communications networks 302, 306, 308 may be performed using a packet-based communication protocol such as the Hypertext Transfer Protocol (HTTP).

In accordance with an embodiment of the present invention, the NOC 304 is provisioned with software, for enabling application developers to register services in the database 304a. The registered services are services which may be performed by one application on behalf of another application.

Figure 4:
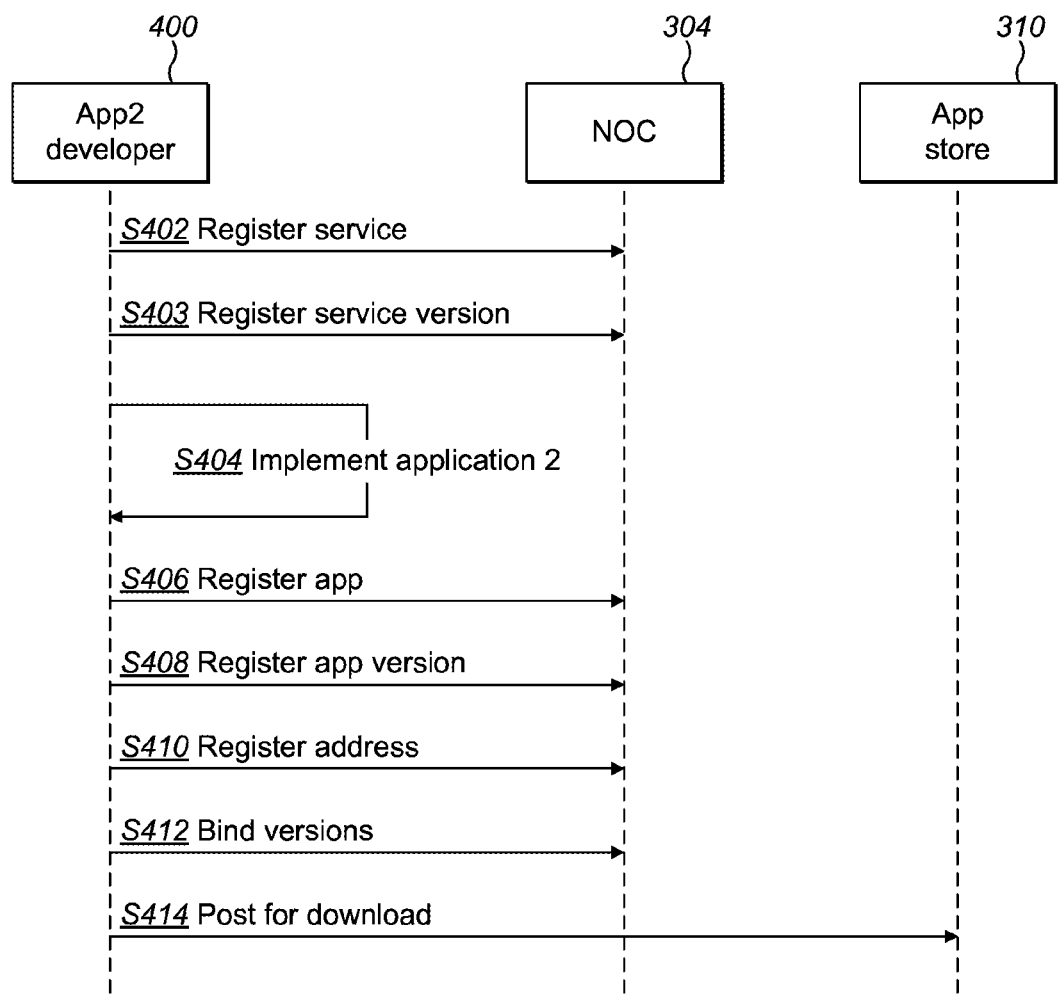
FIG. 4 is a message flow diagram showing an exemplary process for registering a service in accordance with an embodiment.

FIG. 4 shows an exemplary service registration process in which an application developer ("App2 developer" 400) registers a service "service A" with the NOC 304. App2 developer 400 may decide to offer capabilities (i.e. a service) of an application for use by other applications. In order to do so, App2 developer 400 connects to the NOC 4, via a user interface for example. App2 developer 400 registers the relevant service at the NOC 304 by sending a "Register Service" message to the NOC 304 at step S402. The Register Service message includes a service identifier, typically comprising an alphanumeric sequence of characters, which uniquely identifies the service. It may also include an organization identifier identifying an organization with which the service is associated, and a visibility identifier, which identifies whether the service is categorized as "public" or "private". If the service is categorized as private, it is only available for consumption by an application associated with the same organization as the service, or with an organization which has appropriate permissions. If the service is categorized as public, it is available for consumption by any application, irrespective of any organization with which the application is associated. In some cases, the Register Service message may not specify an organization with which the service is associated; in such cases, the service is treated as public. The Register Service message typically also includes a list of functions (methods) performed by the service. For example, in the case of a printing service, the service may offer functions such as "print to fax", "print to pdf" etc.

The Register Service message may optionally include other information, such as a description of the service (e.g. whether the service relates to printing documents, cryptography etc.), and a display name for the service. At step S403, App2 developer 400 registers a version of the service with the NOC 304 by sending a "Register Service Version" message to the NOC 304. The Register Service Version message includes the service identifier sent at step S402, along with a version identifier identifying a version number of the service and an interface definition. The interface definition is an application programming interface (API) describing the input parameters of the version of the service. For example, in the case that the service is a printing service, the API may require that input parameters such as font size, font color etc. are provided by the service consuming application.

Once the service has been registered at the NOC 304, App2 developer 400 implements an application, App2 200b, configured to execute the service, at step S404. App2 developer 400 registers App2 200b by sending a "Register App" message to the NOC 304 at step S406. The Register App message includes an application identifier identifying App2 200b.

At step S408, App2 Developer 400 registers a version of App2 by sending a "Register App Version" message to the NOC 304. The Register App Version message includes the application identifier sent at step S304, along with a version identifier identifying a version of App2 200b.

At step S410, App2 developer 400 sends a "Register Address" message to the NOC 304; the Register Address message includes the application identifier and version identifier sent in steps S406 and S408 respectively, and includes address information indicating an address for the relevant version of the application. The address information defines a destination address of App2 once it has been installed on a user terminal, in order that an application which consumes a service executed by App2 is may contact App2. In the case of an Apple® iOS device, the address may be provided as part of a Uniform Resource Locator (URL) scheme. Preferably, the URL scheme is constructed from the application bundle ID; this enables an application receiving a request to easily construct the return address from the source "bundle ID" information provided with the request. Similarly, in the case of an Android™ device, the address may comprise a "package name".

At step S412, App2 developer 400 sends a "Bind Versions" message to the NOC 304. The Bind Versions message includes the application identifier sent at step S406 and the version identifier sent at step S408, as well as the service identifier sent at step S402 and the service version identifier sent at step S403. The Bind Versions message indicates to the NOC 304 that App2 202b is configured to execute the service registered as service A in steps S402 and S403.

Once the above registration process is complete, App2 developer 400 posts the registered version of App2 202b in the app store 310 at step S414. Once posted in the app store 310, App2 202b may be downloaded to one or more user terminals 100, 150; this may include an authentication process to authenticate a user terminal 100, 150 attempting to download App2 202b. For example, the app store 310 may require entry of user credentials such as a user name and password. In some cases, App2 202b may only be available for download to user terminals 100, 150 associated with a given enterprise or other group, for example.

Note that in some cases the app developer may wish to deregister the service, or a version thereof. This may be done using an "Unbind Versions" message. In the above scenario, this may indicate to the NOC 304 that App2 is no longer available to provide service A, for example.

By compiling registration data provided from different application developers according to application processes as described above with reference to FIG. 4, the NOC 304 is enabled to build sets of entries in the database 304b associating applications with services. FIG. 5a shows schematically an exemplary first set of entries 500 held in the database 304b, the first set of entries indicating applications which can provide particular services. The exemplary first set of entries 500 includes service identifiers 502 identifying services registered with the NOC 304; organization identifiers 504 identifying an organization with which each of the registered services is associated; visibility identifiers 506 identifying whether each of the registered services is categorized as public or private; service descriptions 508 describing characteristics of each of the registered services; version identifiers 510 identifying a version numbers of each of the registered services; interface definitions 512 corresponding to each version of each application (these may be described using Web Services Description Language (WSDL) for example); and application identifiers 514 identifying applications, and respective version numbers of applications that are configured to execute a respective version of a given service. Although not shown in FIG. 5a, the first set of entries may include other information, such as a description of the different functions offered by each service.

Further developers (or other requesting parties) may access the NOC 304 and browse data entries held in the database 304b. This may be done via a bespoke user interface which enables searching of the database 304b, for example. An authentication process may be required in order to access the database 304c; for example, the developer may be required to provide user credentials, such as a user name and/or password. The NOC 304 may be configured to allow a given developer to access data relating to only services which are categorized as public or those which are private and associated with an organization with which the developer is also associated. The NOC 304 may maintain developer records identifying an organization or organizations with which each developer is associated, and determine the relevant organization based on the user credentials.

As described above, the NOC 304 enables registration of services that may be provided by one application to another application. Once a service has been registered at the NOC 304, developers may develop and register multiple applications each capable of providing the service (note that FIG. 5a shows, in some cases, multiple application versions corresponding to a given service version). Further, once a service has been registered, applications consuming the service can readily be developed. A developer may search the service descriptions 508 to identify a suitable service, for example, and once such a service has been identified, retrieve the corresponding interface definition 512. Based on the retrieved interface definition, the developer may then develop an application which consumes the relevant service (i.e. delegates execution of the service to a different application), or which provides the relevant service. In the case of a service consuming application, the application is configured to send, when required, a request for the relevant service, including a service identifier for the service. Accordingly, the registration of services in accordance with the methods described herein facilitates the development of applications which can inter-operate to provide and consume services.

Figure 6:
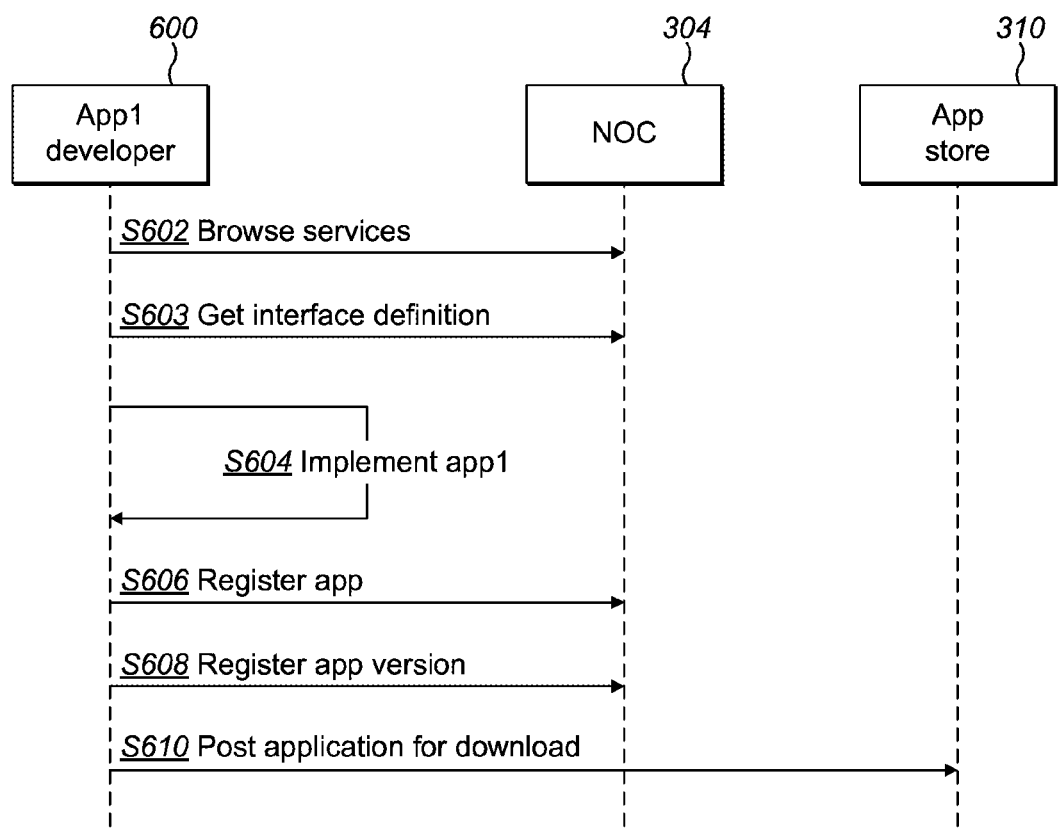
FIG. 6 is a message flow diagram illustrating an application registration process in accordance with an embodiment.

FIG. 6 shows an exemplary process in which a developer "App1 developer" 600 develops and registers with the NOC 304 an application which consumes a service registered on the NOC 304. At step S602 App1 developer 600 browses services registered at the NOC 304 and, once a suitable service (and version thereof) has been identified, obtains the relevant interface definition at step S603; these steps may be performed using a user interface as described above, for example.

The interface definition obtained in step S603 enables App1 developer 600 to implement an application, App1 200a, which consumes the identified service at step S604. App1 developer 600 then sends messages to register App1 200a and a version number with the NOC 304 at steps S606 and S608 respectively, and posts App1 200a at the App1 store 310 at step S610; steps S606 to S610 correspond to S406 to S408 and S414 described above, respectively.

In the registration process for App2 200b described above with reference to FIG. 4, a Register Address message was sent at step S410 to provide destination address information relating to App2 200b. This may be unnecessary in the case of App1 200a, since the latter is a consumer, rather than a provider, of a service, meaning that it may not be necessary for other applications to be able to make contact with App1 200a. However, some applications may be providers as well as consumers of services; for example, a given application may delegate a first service (for example, a printing service) to other applications, but provide a second service (for example, a document viewing service). For applications that are both service providers and service consumers, address information is typically provided to the NOC 304 as described above with reference to FIG. 4.

Once applications have been stored in the app store 310, they may be downloaded and installed on user terminals 100, 150. This may be performed via the NOC 304 acting as a catalog server. The NOC 304 may store entries for different downloadable and installable applications in database 304b. The database 304b may also store metadata associated with each application, such as a title, and short/long description of the intended function of the application. The NOC 304 may store data relating to applications stored in multiple app stores, enabling a user to browse applications stored in multiple different app stores prior to downloading and installing a selected application.

Embodiments of the present invention enable management with respect to inter-application communication of applications, and in particular facilitate discovery of services that one application may execute on behalf of another.

Figure 7:
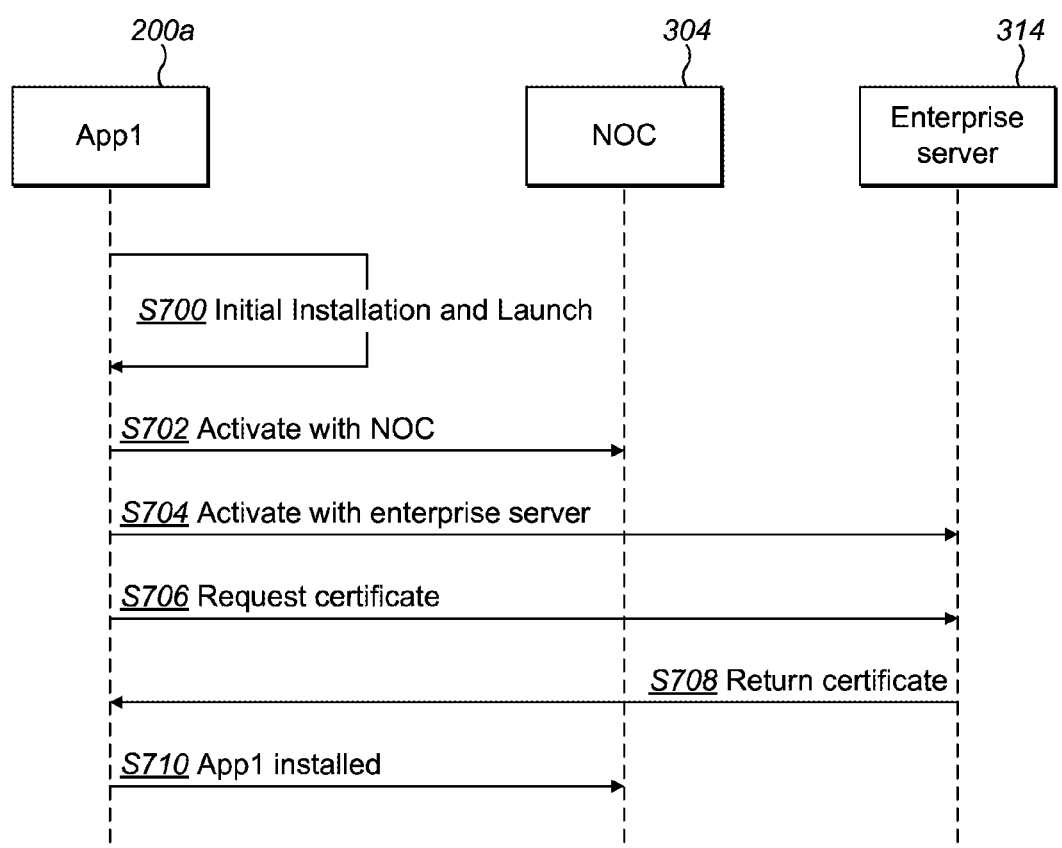
FIG. 7 is a message flow diagram illustrating an application installation process in accordance with an embodiment.

FIG. 7 shows a process by which installation of an application on a user terminal 100 is registered with the NOC 304. Whilst the process is described with reference to App1 200a, a service consuming application, the same process may also be used in the installation of a service providing application.

At step S700 App1 200a is installed and launched on the user terminal 100. This may be in response to a user of the user terminal 100 downloading App1 200a from the app store 310 as described above, and launching same. At step S702 App1 200a sends a message to the NOC 304 including a terminal identifier identifying the user terminal and, optionally, other credentials, such as a user name and password. At step S704, App1 200a sends a further message, also including the user terminal identifier and/or other credentials to the enterprise server 314. Once terminal identifier and/or other credentials have been passed to the NOC 304 and enterprise server 314, either or both of the latter may return alternative credentials (an "instance ID") to the user terminal 100, for app1 200a to use thereafter. This enables the NOC 304 and/or enterprise server 314 to track the instance of app1 200a installed on the user terminal 100.

At step S706 App1 sends a "Request Certificate" message to the enterprise server 314 in order to request certificate signing by same, so as to verify that the user terminal is associated with the organization controlling the enterprise server 314. The certificate may be a public key certificate which is used to in setting up a connection with another application held on the user terminal 100, as is described in more detail below. The enterprise server 314 performs an authentication process to authenticate the user terminal 100 by, for example, determining whether the user terminal identifier and/or other credentials match corresponding data stored at the enterprise server. If the user terminal 100 is authenticated, the enterprise server 314 returns a signed certificate at step S708.

While the steps described above relating to the provision of credentials and exchange of certificates have certain advantages as described herein, in some embodiments these steps are omitted. In some embodiments, for example, where the user terminal 100 is not associated with any particular enterprise, there are no interactions with any enterprise server.

At step S710, App1 200a sends an "App Installed" message to the NOC 304 indicating that App1 200a has been installed on the user terminal 100. The App Installed message may include an application identifier corresponding to App1 200a and a version identifier, which identifies the version of App1 200a that has been installed on the user terminal 100, along with a user terminal identifier identifying the user terminal 100 on which it is installed; the latter may comprise a unique device identifier or the instance ID described above, for example.

As multiple applications are installed and registered on the user terminals 100, 150, the NOC 304 is able to build sets of entries in the database 304b associating user terminals with applications held on the terminals. FIG. 5b shows schematically an exemplary second set of entries 520 held in the database 304b. The second set of entries 520 includes user terminal identifiers 522 for the user terminals registered with the NOC 304; organization identifiers 404 identifying an organization, such as an enterprise or other group with which each registered user terminal 100 is associated; application identifiers 526 identifying applications installed on each registered user terminal 100, 150; and version identifiers 528 identifying a version number of the applications installed on each registered user terminal.

Figure 8:
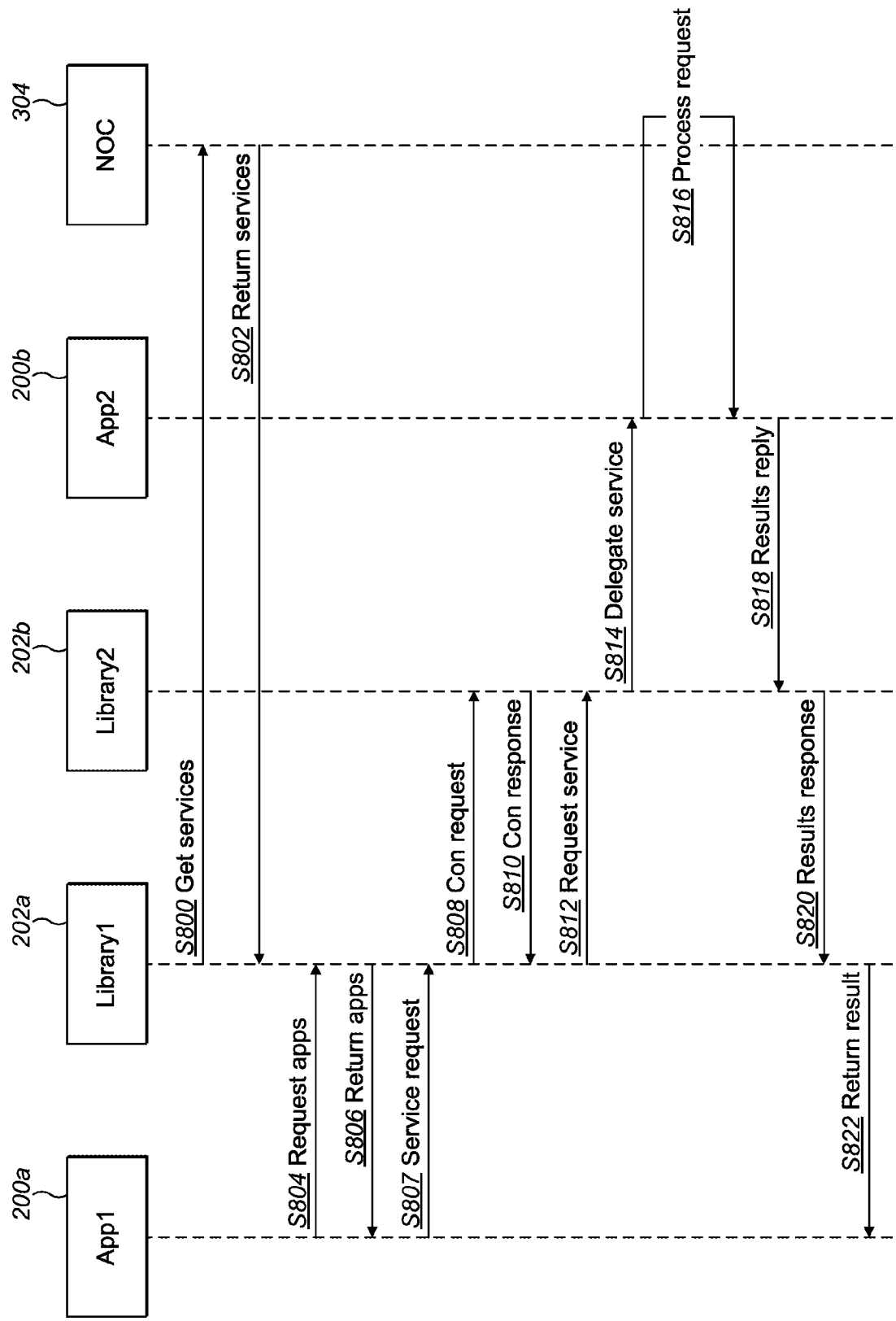
FIG. 8 is a message flow diagram illustrating a service discovery process in accordance with an embodiment.

The user terminals 100, 150 may access the second set of entries 520 held in the database 304b in a service discovery process, which is now described with reference to FIG. 8. FIG. 8 shows interactions between a service consuming application, App1 200a, a service providing application App2 200b, respective associated instances of the library API, Library1 202a and Library2 202b, and the NOC 304.

The service providing application App 2 200b may be held on the same user terminal 100 as the service consuming application App1 200a. However, in some cases, it may be held on a different user terminal 150. For example, a given user may have multiple user terminals, such as a mobile telephone and a lap top computer, each holding different applications. In some embodiments, an application held on one of the user's user terminals (for example, a mobile telephone) delegate a service to an application running on another of the user's user terminals (for example, a lap top computer). In some embodiments, applications held on user terminals associated with a given enterprise or other group are configured to delegate services to other user terminals associated with the same group.

At step S800, Library 1 sends a "Get Services" message to the NOC 304 to request a list of all services that are available to applications installed on the user terminal 100, along with a list of applications that are configured to provide the available services. At step S802, the NOC 304 determines the applications and supported services, and returns a list of same; an exemplary process for determining the applications and supported services is described below with reference to FIG. 9.

Having received the list of applications and services at step S802, Library1 202a caches data representing same in memory 108. Library1 202a thus acts as a data store storing entries indicating the applications held on the user terminal 100, and indicating services that may be executed, on request, by corresponding applications. Library1 202a may receive and store other information, such as address information relating to the address of the service providing applications; this address information corresponds to the address information provided to the NOC 304 at step 410 of FIG. 4. In the case of a service providing application held on a different user terminal 150 from the user terminal 100 to which the list is provided, the address data supplied by the NOC 304 may include a user terminal identifier identifying the user terminal 150 holding the service providing application. Storing information in this way enables Library1 202a to manage requests for available services from service consuming applications, as is now explained.

At step S804, App1 determines that a given service is required, and sends a request to Library1 202a for applications that perform the given service. For example, in the case that App1 200a is a word processing service it may determine that it requires a printing service in response to a user selection of a printing options. The request sent to Library1 202a includes the service identifier for the required service.

As described above, Library1 202a has stored in memory entries indicating services available on the user terminal 100 and applications which are configured to execute those services. Based on the received service identifier, Library1 202a determines whether there are any applications available to App1 200a which are configured to use the service. If Library1 202a determines that there are one or more such applications available to App1 200a, it returns a list indicating same, and including corresponding application identifiers, to App1 200a at step S806.

In the case that Library1 202a identifies multiple applications configured to execute the requested service, App1 200a selects one of the identified applications for delegation of the service. This selection may be made at random, or the first listed application may be selected, for example. In another example, App1 200a may provide the user with an option to select one of the listed applications.

In some embodiments, priority rules may be used to select an application in the event that Library1 202a identifies multiple applications configured to execute the requested service. For example, if one of the service providing applications is held on the same user terminal as App1 200a, it may be prioritized over applications held on other user terminals. This may help to reduce delays in processing the requested service, since communication between applications held on the same user terminal is likely to be less prone to delay than communication between mutually remote user terminals.

Further, in the event that both or all identified service providing applications are held on user terminals different from the user terminal holding App1 200a, the selection may be made based on status or other information regarding the relevant user terminals. This information could be stored in the database 304b of the NOC 304, and provided to the user terminal 100 as part of the list provided at step S802. Alternatively, the information could be provided separately to the user terminal 100, for example in response to a request from same, the request being generated upon determining that multiple applications held on remote user terminals have been identified.

For example, the selection may be made based on an OS associated with the user terminal in question. It may be advantageous to select an application held on a user terminal running the same operating system as the user terminal 100a on holding App1.

In another example, the selection is based on location information relating to the user terminals. For example, it may be advantageous to select an application held on a user terminal that is located closer to the user terminal 100 holding App1 200a; this may help to reduce delays in processing the request.

In yet another example, the selection may be selected based on the type of connection which the user terminal holding the service providing application has with the network; for example, it may be advantageous from a cost perspective to prioritize applications held on user terminals connecting via a Wireless Local Area Network (WLAN) (using WiFi, for example) over those connecting via a cellular network (such as an LTE network).

In the event that there are no applications on the user terminal 100 which are configured to execute the requested service, Library1 202a returns a message to App1 200a indicating that no such application is available. The user of the user terminal 100 may then be presented with a message indicating that the service cannot be performed. The message may also include a suggestion of how a suitable application may be obtained; this may include a link, such as a hyperlink, to the app store 310, for example.

In the present example, we assume that App2 200b has been selected by App1 200a to execute the required service. At step S807, App1 200a sends a request to Library1 202b to send a service request to App2 202b. This request includes an application identifier of App2 202b, along with a service identifier and a service version identifier, where appropriate. Other information included in the request message may include: an indication of a particular function to be performed by the App, parameters required for the performance of the required function, and file attachments including data in relation to which the service is to performed (for example, documents that are to be printed).

At steps S806 and S808 Library1 202a set up a connection, such as a Transmission Control Protocol (TCP)/Transport Layer Security (TLS) connection, between App1 200a and App2 200b. This involves Library1 202a sending a connection request at step S808 and Library2 202b sending a connection response at step S810. The exchange of the connection request and connection response prior to establishment of the connection has several advantages. For example, if App2 200b is not running it may not be "listening" for (i.e. configured to receive) an incoming TCP connection; the connection request may therefore be sent using as a non-TCP based protocol, triggering App2 200b to start, in the event that it is not already running.

There may also be security advantages associated with the exchange of the connection request and connection response messages. The operating system of the user terminal 100 may add information to each of the messages identifying the application that is the source of the message. The information added by the operating system may be considered more trusted than information included by the application itself, and may therefore serve as a form of authentication.

The connection request and connection response may each include a certificate, as obtained at steps S706 and S708 described above with reference to FIG. 7, enabling a secure (e.g. encrypted) connection to be set up between App1 200a and App2 200b. Further, the TLS "handshake" for the connection established as a result of the connection request and connection response messages may also involve an exchange of certificates. Each of App1 200a and App2 200b can therefore verify that the other is the same application that took part in the exchange of connection request and connection response messages by determining whether the certificates exchanged as part of the handshake match those exchanged in the connection request and connection request messages.

The exchange of certificates may also enable App1 200a and App2 200b to determine whether they are authorized to interact with one another, by validating whether both certificates are signed by the same authority (e.g. the same enterprise). For example, a given enterprise may allow applications activated with the given enterprise to interact only with applications also activated against the same enterprise. If the certificates are signed by different enterprises, a policy of one enterprise or the other may be implemented to prevent the applications interacting.

In another example, a trust relationship may be established between groups of users associated with respective different enterprises that do not share a certificate, in order that services may be shared between members of the different groups. This may be done by, for example, an administrator of each enterprise obtaining, from a trusted certificate authority, a copy of a public certificate associated with enterprise server of the enterprise, and sending the certificate (by secure e-mail, for example) to an administrator of the other enterprise. Each administrator may then register the other's certificate for distribution to users associated with the latter's enterprise. The other mechanisms may be used to establish secure communication between user terminals. For example, users of the devices may exchange authentication information such as a password or passcode, out-of-band (for example by telephone). An initial connection may be then established between the devices over which the authentication information is exchanged to mutually authenticate the devices. Once the devices have been authenticated, they may then exchange public keys in order to secure future connections. This process has the advantage that it does not require the presence of a trusted certificate authority.

Once the connection between App1 200a and App2 200b has been established, Library1 202a sends a "Request Service" message to Library2 202b at step S812. The Request Service message includes a service identifier of the requested service and, along with, where appropriate, a version identifier, a function identifier identifying a particular function requested, parameters associated with the request and any attachment received at step S807.

Library2 202b then passes the request on to App2 202b at step S814, enabling App2 202b to process the request at step S816. The result of the processing is passed back to Library2 202b at step S818, from Library2 202b to Library1 202a at step S820 and from Library1 202a to App1 200a at step S822. The result that is returned to App1 200a may include data resulting from the processing (for example, a modified attachment) and/or a message indicating that the requested function was successfully performed (for example, the result may indicate that a printing process was successfully completed).

In the case that the service consuming application and service providing application are held on different user terminals, communication between the two applications, including the connection request and connection response (steps S808 and S810), typically takes place via the NOC 304. In the above example, Library1 202a obtained available services (steps S800 and S802) from the NOC 304 prior to receiving the request for applications from App1 at step S804. The Get Services request of step S800 may be sent in response to App1 being launched, for example. Holding information regarding available services and application locally in memory at the user terminal 100 helps to minimize delay in obtaining information regarding services when requested.

In some cases, the Get Services request may be sent periodically, for example once per day, in order to get updated lists of services and applications held on the user terminal 100. In other cases, the Get Services request may be sent in response to receiving the request from App1 200a at step S804 for applications available to perform a particular service. In such cases, the information regarding available applications and services may not be held locally on the user terminal 100, with each request for applications to perform a service resulting in a different Get Services request to the NOC 304. This may help to ensure that up-do-date information is provided to the requesting application. Alternatively, in the case that the information regarding available applications and services is held locally on the user terminal 100, updates may be pushed from the NOC 304 to the user terminal 100 when relevant changes are made to the data stored in the former.

Figure 9:
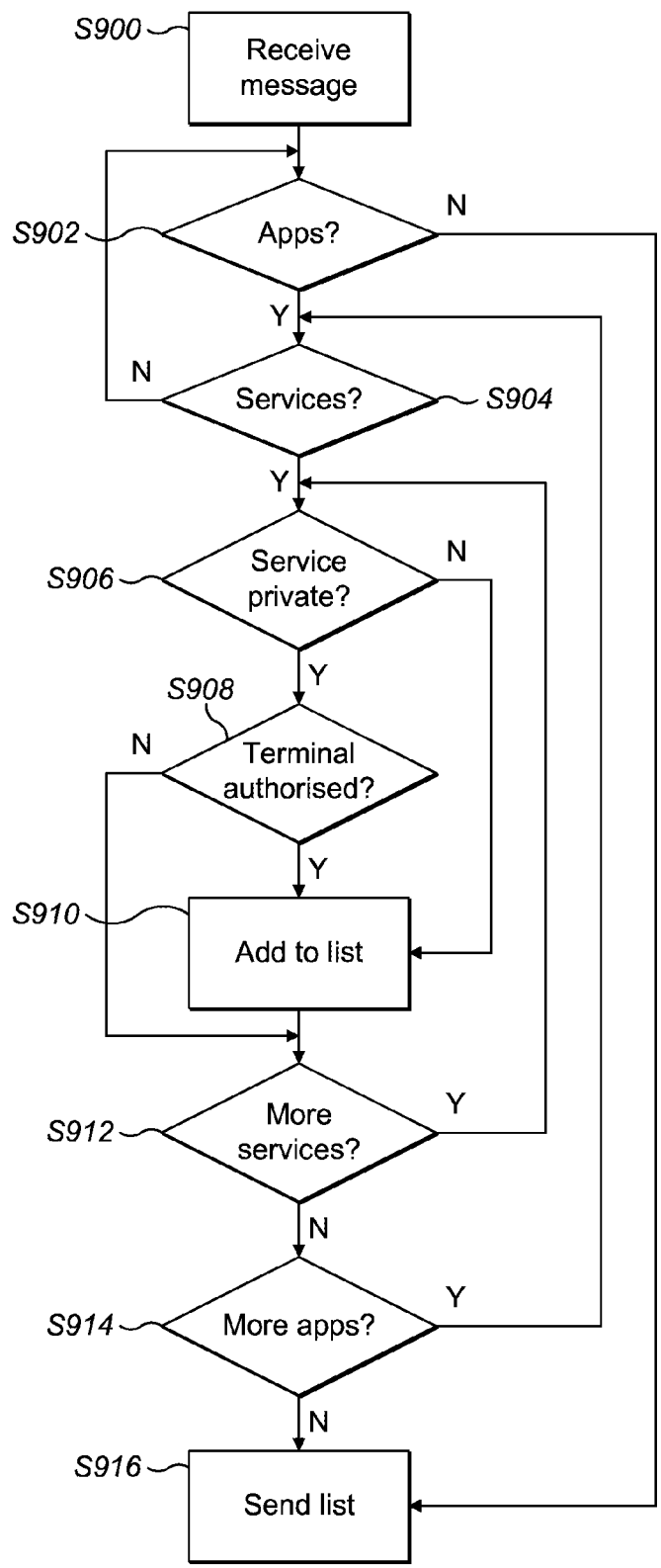
FIG. 9 is a flow chart illustrating processes performed at a server system in determining services available on a user terminal.

FIG. 9 is a flow diagram showing an exemplary process performed by the NOC 304 in generating a list of services and corresponding applications available on the user terminal 100, per step S802 described above.

At step S900, the NOC 304 receives a message from the user terminal 100 comprising an identifier of the user terminal 100; this message corresponds to the Get Services message of step S800 described above.

At step S902, the NOC 304 accesses the second set of entries 520 shown in FIG. 5b and, based on the received terminal identifier, determines whether there are any applications held on the user terminal 100. In embodiments in which applications may delegate services held on remote user terminals, step S902 also involves identifying these remote terminals and applications held thereon. For example, if a given enterprise allows sharing between applications held on user terminals associated with the given enterprise, this may involve identifying user terminals having the same organization identifier 524 as the requesting user terminal. In another example, the second set of entries 520 held at the NOC 304 may include entries indicating a user associated with each terminal; step S902 may then involve identifying all user terminals associated with the same user as the requesting terminal.

In a still further example, the message received by the NOC 304 at step S900 may include an identifier of a particular user, different to the user associated with requesting user terminal 100. The NOC 304 may then identify applications associated with the identified user e.g. applications held on terminals associated with the identified user. Similarly, the message may identify a particular user terminal, and the NOC 304 may identify applications held on the identified terminal. This may be done in the case that the user of the requesting user terminal 100 wishes to share data with a user of another terminal; for example, one user may wish to share a document with a user of another terminal, and initiate sending of the message received by the NOC 304 at step S902, to identify applications available on the target user's device or devices that are capable of receiving and processing the document.

The user identifiers indicated mentioned above may comprise an e-mail address, or a unique numerical identifier, for example.

In the case that no applications are identified at step S902, the process proceeds to step S916, where an empty list including no applications or services is returned to the user terminal 100. If however, one or more applications are identified, the process then proceeds to step S904, where the NOC 304 accesses the first set of entries 500 shown in FIG. 5a, and searches same to identify a service provided by the identified application. If the identified application does not provide any services, the NOC 304 returns to step S902 to identify whether there are any other applications available to provide services to application held on the requesting user terminal 100.

Assuming that a service has been identified, the NOC 304 proceeds to step S906 where it determines, based on the first set of entries 500 whether the identified service is categorized as public or private. If the service is categorized as private, then it is determined at step S908 whether the user terminal is authorized to make use of the service. This may involve comparing the organization identifier 504 associated with the service with the organization identifier 524 associated with the user terminal 100. If the identifiers match, indicating that the user terminal 100 and the service are both associated with the same organization, then the NOC 304 may determine that the user terminal 100 is authorized to use the service. Conversely, if the organization identifiers do not match, the NOC 304 may determine that the user terminal 100 is not authorized to use the service. However, in some cases, one organization may allow user terminals associated with another organization to use services associated with the former; in these cases, the NOC 304 may store data indicating that certain organizations are authorized to use services associated with other organizations, and to authorize user terminals 100 accordingly.

If it is determined at step S906 that the user terminal 100 is authorized to use the service, or if it is determined at step S906 that the service is public, then the service and application identified at steps S904 and S902 respectively are added, at step S910, to the list of services and applications to be sent to the user terminal 100. The process the proceeds to step S912, described below.

On the other hand, if it is determined that the user terminal 100 is not authorized to use the service, then the service is not added to the list and the process proceeds directly to step S912.

At step S912, the NOC 304 determines whether the application identified at step S902 is a provider of any further services. If a further such service identified, steps S906, S908 and S910 (if applicable) are performed for the further service.

If no such further service is identified at step S912, the NOC 304 determines, at step S914, whether the user terminal 100 is associated with any further applications. If a further such application is identified, steps S904 to S912 are repeated for the further application. Otherwise the process proceeds to step S916 where the list generated according to the preceding steps is sent to the user terminal 100; this list corresponds to the list sent at step S802 described above.

It was described above that the list provided at step S916/S802 may include only public services and services associated with the same organization as the user terminal 100. A further consideration is that some organizations may not authorize use of all applications associated with the organizations for all users of user terminals 100 associated with the organization. Therefore, even where the organization identifier 504 associated with the service and the organization identifier 524 associated with the user terminal 100 do match, the service may not be available to the user terminal 100, if it is provided only by an application which the respective user is not authorized to use.

In some embodiments, a user of a user terminal may "hide" applications and/or services held on the user terminal from discovery by other users. This may be done by the user interacting with their enterprise server, via a user interface for example, to set certain applications or services as not available to other users. Additionally or alternatively, the user may be able to configure a setting such that a service is available, but the details (such as the identity) of the application providing the service, are not communicated to the terminal requesting the service.

The enterprise server may then communicate the user settings, together with enterprise policy where appropriate, to the NOC 304.

In such cases, there may be additional steps (not shown) in which the NOC 304 determines, for each given service associated with the same organization as the user terminal 100, whether the service is provided by an application which the user is authorized to access, and/or whether an application and/or service has been set as "hidden" by a user or by enterprise policy. To this end, the second set of entries 520 may include entries (not shown) indicating applications which the user of a given user terminal 100 is and/or is not authorized to use and/or entries indicating whether applications and/or service have been set as "hidden". Since, as described above with reference to FIG. 5a, the first set of entries 500 may indicate a correspondence between services and applications providing the services, this enables the NOC 304 to identify which services, if any, a user of the user terminal 100 is authorized to use. In this case, the list returned to the terminal at step S916/S802 may only include services which are provided by an application which the user is authorized to use and/or which are not set as "hidden".

The systems and methods described above provide a framework in which inter-application functionality of applications held on a user terminal are improved by appraising applications held on the user terminal of services that are available from other applications held on the same, or a different, user terminal.

In some embodiments, service providing applications may additionally or alternatively held on a server remote from the user terminal 100 holding the service consuming application. For example, the service providing application may be held on an enterprise server 314, separated from the user terminal 100 by a firewall.

The developer of such an application may follow a similar process to that described above with reference to FIG. 4, registering (if not already registered) a service and version thereof with the NOC 304, as described in steps S402 and S403 above. The developer then implements the application, and registers the application and version thereof with the NOC 304 as described in relation to steps S404 to S408 above.

The developer also provides address information, as described in relation to step S410; in the case of a service providing application to be held on a server, the address information may include a URL of the application. Once the address information has been registered at the NOC 304, the developer sends a Bind Versions message to the NOC 304, as described in relation to step S412. Rather than posting the application to the app store 310 as described in relation to step S414, the developer instead stores the application in a server, such as an enterprise server.

Once registered at the NOC 304 as described above, the service providing application may be "discovered" by applications held on user devices according to the processes described above. That is, the list of services and applications returned to the user terminal 100 at step S802 may include one or more applications held on a server, along with the services provided by those applications. If an application held on a server is categorized as "public", it is included in the list irrespective of a group or organization with which the requesting user terminal 100 is associated. If the application held on a server is categorized as "private" it is included in the list only if the requesting terminal is associated with the same group or organization as the application, as described above.

Providing services from an application held on a server rather than a user device enables the developer and/or an organization associated with the server to provide the relevant service without a requirement for the application to be downloaded and installed on the user device. This may be particularly advantageous, where the service providing application is unsuitable for installation on a user terminal (for example, if the application requires a large amount of memory space and/or processing resources), or if the application is one which is more suitable to be administered centrally, for example in the case of a contacts directory lookup application, cloud storage application or an enterprise forum/blogging application.

The above some embodiments are to be understood as illustrative examples of the invention. Further some embodiments of the invention are envisaged. For example, whilst it was described above that a database 304b is maintained by the NOC 304 including the first set of entries 500 indicating applications stored on the user terminal 100, and services provided by the applications, in some embodiments, this data may be stored locally on the user terminal 100 itself. It is to be understood that any feature described in relation to any one embodiment may be used alone, or in combination with other features described, and may also be used in combination with one or more features of any other of the some embodiments, or any combination of any other of the some embodiments. Furthermore, equivalents and modifications not described above may also be employed without departing from the scope of the invention, which is defined in the accompanying claims.

What is claimed is:

1. A method for use by a first user terminal, the first user terminal comprising a processor and a first application to be executed by the processor, the first application being configured to delegate execution of a first service to a further, different, application, the method comprising:
    storing, at a data store, entries identifying a plurality of applications and one or more services that may be executed, on request, by a corresponding application of the plurality of applications;
    receiving a request message from the first application, the request message comprising an identifier of a first service, wherein the first application does not provide the first service;
    accessing the data store to determine one or more applications held on the one or more user terminals capable of executing the first service on behalf of the first application;
    sending a response message for receipt by the first application, the response message identifying the determined one or more applications capable of executing the first service on behalf of the first application; and
    the first user terminal executing the identified one or more services on behalf of the first application based on the response message.

2. The method according to claim 1, in which the determined one or more applications are each held on the first user terminal.

3. The method according to claim 1, in which at least one application from the determined one or more applications is held on a second user terminal, different from the first user terminal.

4. The method according to claim 3, in which the request message comprises an identifier of the second user terminal, and the method comprises determining one or more applications held on the second user terminal capable of executing the first service on behalf of the first application.

5. The method according to claim 1, in which the response message comprises address information relating to an address of at least a given application of the determined one or more applications.

6. The method according to claim 5, in which the response message comprises a version identifier identifying a version number of the given application.

7. The method according to claim 1, in which the data store is held at the first user terminal.

8. The method according to claim 7, further comprising:
    retrieving, from a server system remote from the first user terminal, data identifying applications held on the one or more user terminals and services that may be executed, on request, by the applications held on the user terminal; and maintaining the entries stored at the data store on based on the retrieved data.

9. The method according to claim 1, in which the data store is held at a server system remote from the first user terminal.

10. The method according to claim 1, in which at least the second application is held on a server device, remote from the first user terminal.

11. A computer program product comprising a non-transitory computer-readable storage medium having computer readable instructions stored thereon, the computer readable instructions being executable by a first user terminal to cause the first user terminal to perform a method for use on the first user terminal, the first user terminal comprising a processor and a first application to be executed by the processor, the first application being configured to cause the processor to delegate execution of a first service to a further, different, application, the method comprising:
  storing, at a data store, entries indicating a plurality of applications held on one or more user terminals, and indicating one or more services that may be executed, on request, by a corresponding application of the plurality of applications;
  receiving a request message from the first application, the request message comprising an identifier of a first service, wherein the first application does not provide the first service;
  accessing the data store to determine one or more applications held on the one or more user terminals capable of executing the first service on behalf of the first application;
  sending a response message for receipt by the first application, the response message identifying the determined one or more applications capable of executing the first service on behalf of the first application; and
  the first user terminal executing the identified one or more services on behalf of the first application based on the response message.

12. The computer program product according to claim 11, in which the determined one or more applications are each held on the first user terminal.

13. The computer program product according to claim 11, in which at least the second application is held on a second user terminal, different from the first user terminal.

14. The computer program product according to claim 13, in which the request message comprises an identifier of the second user terminal, and the method comprises determining one or more applications held on the second user terminal capable of executing the first service on behalf of the first application.

15. The computer program product according to claim 11, in which the response message comprises address information relating to an address of at least a given application of the determined one or more applications.

16. The computer program product according to claim 15, in which the response message comprises a version identifier identifying a version number of the given application.

17. The computer program product according to claim 11, in which the data store is held at the first user terminal.

18. The computer program product according to claim 17, the method further comprising:
  retrieving, from a server system remote from the first user terminal, data identifying applications held on the one or more user terminals and services that may be executed, on request, by the applications held on the user terminal; and
  maintaining the entries stored at the data store on based on the retrieved data.

19. A server system for use with a plurality of user terminals, the server system comprising a memory and one or more processors, the user terminals each comprising one or more applications for execution thereon, the memory being configured to store:
  a plurality of user terminal identifiers each identifying a user terminal of the plurality user terminals;
  a plurality of application identifiers, each of the application identifiers identifying an application held on a respective user terminal; and
  a plurality of service identifiers, each of the service identifiers identifying a service that may be executed by a respective application on behalf of a further, different, application, wherein the further, different, application does not provide the respective service, the one or more processors being configured to:
  receive a request message from a first user terminal, the request message comprising a first user terminal identifier identifying the first user terminal;
  access the memory to identify, based on the first user terminal identifier, one or more of the applications and one or more services that corresponding ones of the identified applications are configured to execute; and
  send a response message to the first user terminal, the response message identifying the identified one or more applications and corresponding one or more services;
  wherein the first user terminal executes the one or more services on behalf of the identified one or more applications based on the response message.

20. A server system according to claim 19, wherein each of the user terminals and each of the services is associated with to one or more groups of a plurality of groups, and the memory is configured to store data indicating one or more groups with which each of the user terminals and each of the applications is associated,
  wherein the services are categorized according to a plurality of categories, and the memory is configured to store data indicating a category of each of the services, the plurality of categories including a first category and a second category, the first category comprising services that may be provided to applications that are not associated with the same group as the service, and the second category comprising services that may not be provided to applications that are not associated with the same group as the service,
  wherein, in the case that a given identified service of the second category is not associated with a group with which the first user terminal is associated, the one or more processors are configured not to identify the given identified service in the response message.

21. The server system according to claim 20, wherein the plurality of groups each relate to an enterprise.

22. The server system according to claim 19, wherein the one or more processors are further configured to:
  receive an input from a second user terminal, the input comprising a second user terminal identifier identifying the second user terminal and an application identifier identifying a second application held on the second user terminal, the input indicating that distribution of information regarding the second application is to be restricted; and
  responsive to a second request message identifying a service that the second application is configured to execute, restricting the information provided regarding the second application in a response message sent responsive to the second request message.

\* \* \* \* \*